United States Patent [19]

Formia et al.

[11] 4,291,650
[45] Sep. 29, 1981

[54] CYLINDER HEAD FOR COMPRESSION-IGNITION INTERNAL COMBUSTION ENGINE

[75] Inventors: Antonio Formia, Turin; Giorgio Filtri, Moncalieri, both of Italy

[73] Assignee: Fiat Veicoli Industriali S.p.A., Turin, Italy

[21] Appl. No.: 109,426

[22] Filed: Jan. 3, 1980

[30] Foreign Application Priority Data

May 23, 1979 [IT] Italy ............................ 68096 A/79

[51] Int. Cl.³ ........................... F01P 3/02; F02F 1/26
[52] U.S. Cl. ......................... 123/41.82 A; 123/41.86; 123/90.27; 123/193 H
[58] Field of Search ................. 123/41.82 R, 41.82 A, 123/41.86, 193 R, 193 H, 193 CH, 90.27, 195 R, 254

[56] References Cited
U.S. PATENT DOCUMENTS

| | | | |
|---|---|---|---|
| 2,182,990 | 12/1939 | Kishline | 123/41.82 A |
| 2,739,579 | 3/1956 | Ware et al. | 123/41.82 A X |
| 3,022,775 | 2/1962 | Bouvy | 123/41.82 A |
| 4,018,195 | 4/1977 | Bandrowski, Jr. | 123/193 H X |

Primary Examiner—Tony M. Argenbright
Attorney, Agent, or Firm—Sughrue, Mion, Zinn, Macpeak and Seas

[57] ABSTRACT

A cylinder head for a compression-ignition internal combustion engine comprises a lower part of cast iron, an intermediate part of aluminium, and a cap element, also of aluminium. Defined within the cast-iron lower part are precombustion chambers for the engine cylinders, induction and discharge ducts and a cooling chamber. The regions of the head subjected to the highest temperatures during running of the engine are thus formed in the cast-iron part which minimizes difficulties caused by thermal stresses. A breather cavity is defined between the cast-iron lower part and the aluminium intermediate part. The upper surface of the intermediate part is shaped to form an oil bath and is arranged to rotatably support the engine camshaft in this bath. Apertures through the intermediate part serve both to regulate the oil level in the bath and to provide access to fixing bolts securing the lower part of the head to the engine cylinder block.

2 Claims, 5 Drawing Figures

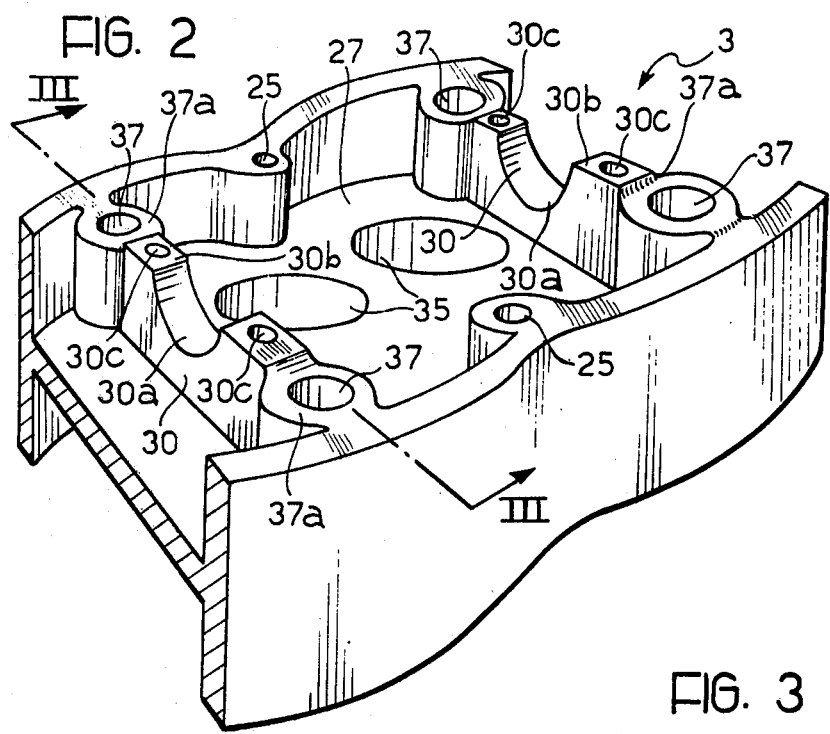
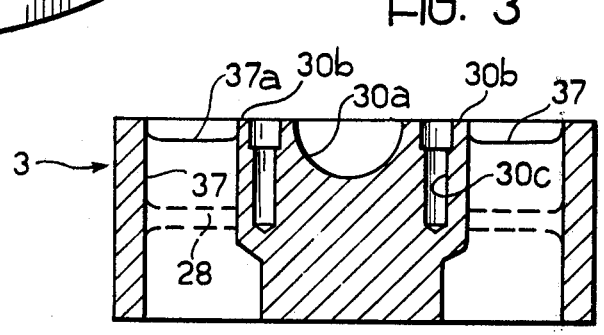
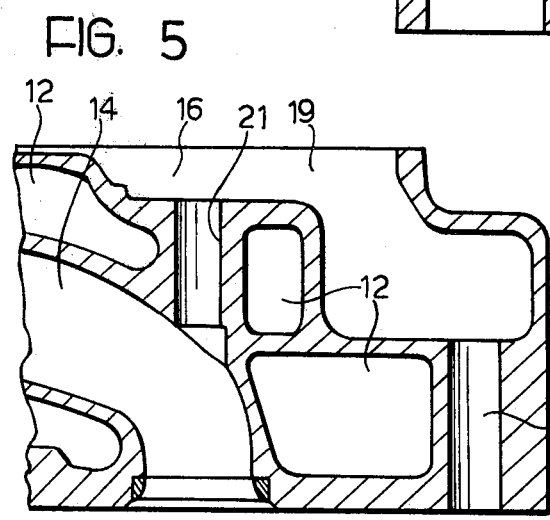

CYLINDER HEAD FOR COMPRESSION-IGNITION INTERNAL COMBUSTION ENGINE

The present invention relates to cylinder heads for compression ignition internal combustion engines of the type provided with precombustion chambers associated with the engine cylinders.

Precombustion diesel engines are often used in motor vehicles and for such applications, the cylinder head is normally produced in aluminium. However, although an aluminium cylinder head is advantageous as regards lightness, the use of aluminium makes the cylinder head more susceptible to undesirable thermal effects experienced at high operating temperatures than a head made of cast iron. Such undesirable effects include stresses of thermal origin which are particularly significant in fast-running diesel engines with precombustion chambers, this being the type of engine which is normally used for diesel-powered motor vehicles. This can give rise to difficulties insofar as engine reliability is concerned, especially when the engine is of the supercharged type. In fact for such engines the values of the maximum combustion pressure and of the thermal loads which occur during the operation of the engine can be as much as 30–50 percent greater than the corresponding values which occur in a similar engine of the induction type.

It is therefore an object of the present invention to provide a cylinder head in which the aforesaid difficulties concerning engine reliability are alleviated.

According to the present invention, there is provided a cylinder head for a compression ignition internal combustion engine, wherein:

(a) the cylinder head comprises a cast iron lower part which is to be fixed onto the cylinder block of the engine and which is formed to define both a cooling chamber through which engine coolant can flow and a plurality of cavities providing for each of the cylinders of the engine a precombustion chamber, a seat for a fuel injector, and induction and discharge ducts, (b) the cylinder head further comprises an aluminium intermediate part mounted on the said cast iron lower part and an upper cap element of aluminium surmounting the said intermediate part, the upper surface of the aluminium intermediate part being shaped to form a bath for lubricating oil and being provided with support means for rotatably supporting the camshaft of the engine, (c) the cast iron lower part and the aluminium intermediate part define between them a breather cavity which communicates with the outside and which when the head is mounted on the engine block is arranged to communicate with the space underlying the piston within each cylinder of the engine, so as to enable exhaust of air in said space as each piston travels towards its bottom dead centre position, (d) the aluminium intermediate part has a number of vertically-extending apertures which communicate at their lower ends with said breather cavity and which at their upper ends open out into the upper surface of the said intermediate part at a level above the bottom of the oil bath, said apertures serving to limit the level of lubricating oil within the bath, and (e) the cast iron lower part is formed with bolt holes for the location of fixing bolts for securing the cast iron lower part to the engine block, said bolt holes lying within the external periphery of said intermediate part in alignment with respective ones of said apertures whereby access to said fixing bolts is possible without the need to remove the aluminium intermediate part from the cast iron lower part.

The term 'aluminium' used herein to describe the material composition of various parts of the cylinder head, is intended to include alloys of aluminium.

The cylinder head of the above form can be used in supercharged precombustion diesel engines without adversely affecting engine reliability.

A cylinder head embodying the invention will now be particularly described, by way of example, with reference to the accompanying diagrammatic drawings, in which:

FIG. 2 is a partial perspective view of an aluminium intermediate part of the cylinder head shown in FIG. 1;

FIG. 3 is a section on line III—III of FIG. 2;

FIG. 5 is a section on line V—V of FIG. 4.

Figure 1:
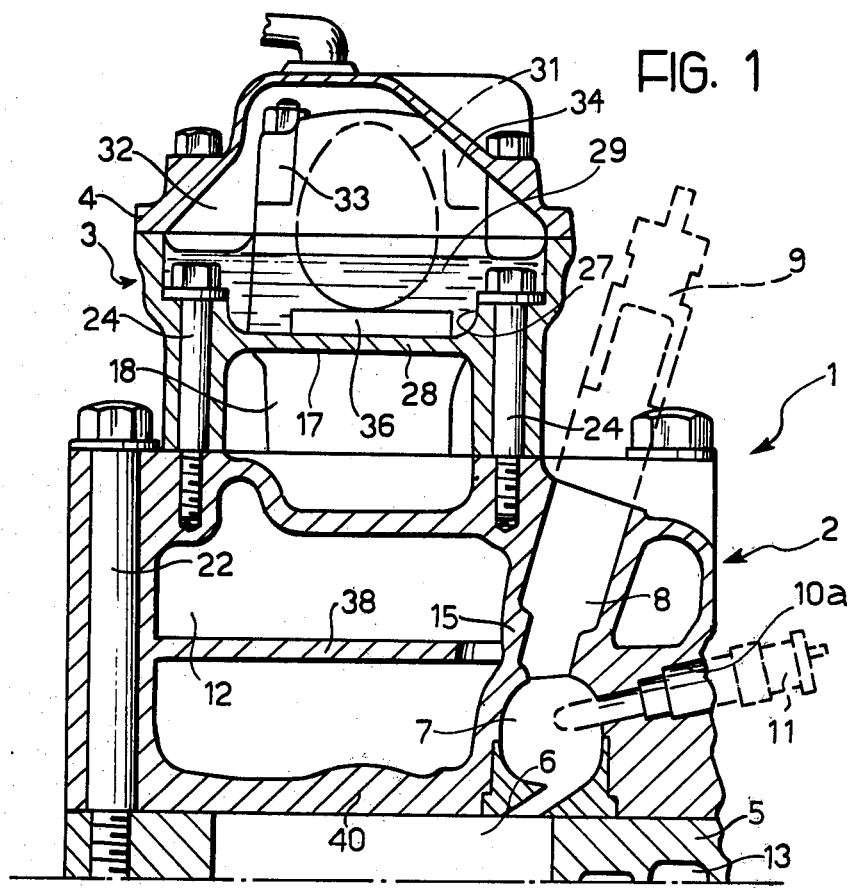
FIG. 1 is a cross section of the cylinder head fixed to the cylinder block of a diesel engine, only part of the cylinder block being shown.

The cylinder head 1 shown in FIG. 1 comprises a cast iron lower part 2, an aluminium intermediate part 3, and an upper cap element 4 which is also of aluminium.

The cast iron lower part 2 is fixed onto a cast iron cylinder block 5 in which a number of cylinders 6 are formed. In correspondence to each of the cylinders 6, the cast iron cylinder-head part 2 is provided with a cavity 7 constituting a precombustion chamber which in the present example is of the vortex type. Each precombustion chamber 7 communicates at its upper end both with a cavity 8 which acts as a seat for a fuel injector 9 (shown in broken lines in FIG. 1), and with a threaded hole 10a arranged to receive a preheater glow plug 11 (also shown in broken lines) for preheating fuel in the precombustion chamber 7. In addition to the cavities 7 and 8, and the holes 10a, the cast iron block which constitutes the lower cylinder-head part 2 is formed with the usual induction and discharge ducts associated with the cylinders 6 (one such duct is indicated by reference 14 in FIG. 5). Also provided in the lower part 2 of the cylinder head 1 is a cooling chamber 12 which communicates with a cooling jacket 13 formed in the engine cylinder block 5. This cooling chamber 12 is bounded along its bottom by a base wall 40 the outer surface of which faces the cylinders 6 when the cylinder head 1 is mounted on the cylinder block 5. Engine coolant flowing through the coolant chamber 12 serves to cool the base wall 40 as well as the internal walls of the part 2 which delimit the precombustion chambers 7, the seats 8 for the fuel injectors, and the induction and discharge passages 14. In particular, coolant flowing through the chamber 12 flows over internal walls 15 each of which delimits one of the precombustion chambers 7 and its corresponding cavity 8.

The upper surface 16 of the cylinder head part 2 is recessed (see FIGS. 4 and 5) and cooperates with the lower surface 17 (see FIG. 1) of the aluminium intermediate part 3 to define a breather cavity 18 which communicates by means of passages 19 and ducts 20 (see FIGS. 4 and 5) with the spaces underlying the pistons within their respective engine cylinders 6. The cavity 18 is used to exhaust air present in the aforesaid space during the descent of each piston to its bottom dead centre. This cavity 18 is also in communication with the outside through an opening (not illustrated) for the emission of air. The cast iron lower part 2 is also formed with seats 21 (see FIGS. 4 and 5) for the induction and discharge valves associated with each engine cylinder 6.

Figure 4:
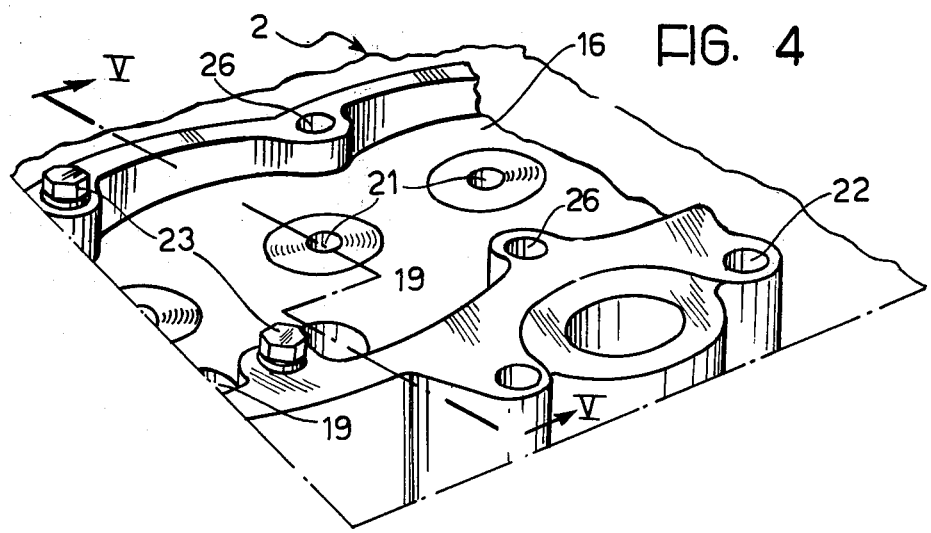
FIG. 4 is a partial perspective view of a lower cast iron part of the cylinder head shown in FIG. 1.

The cast iron lower part 2 is fixed onto the engine block 5 by bolts 22 located outside the periphery of the aluminium intermediate part 3, and by bolts 23 the heads of which are covered by the aluminium intermediate part 3 (two such bolts 23 are shown in FIG. 4). The aluminium intermediate part 3 is fixed only to the cast iron lower part 2, this fixing being effected by bolts 24 (FIG. 1) which extend through holes 25 in the intermediate part 3 (FIG. 2) to engage in holes 26 formed in the cast iron lower part (FIG. 4).

The aluminium intermediate part 3 is approximately H-shaped in cross-section with an intermediate horizontal dividing wall 28. The upper surface of the aluminium intermediate part 3 defines a bath 27 which is filled with lubricating oil 29. Extending transversely across the oil bath 27 are a number of supports 30 (see FIG. 2) integral with the part 3 and arranged to rotatably mount the engine camshaft 31 (shown in broken lines in FIG. 1) within the space 32 delimited at the bottom by the upper surface of the intermediate part 3 and at the top by the cap element 4. Each of the supports 30 has a seat 30a for receiving and supporting the camshaft 31, and two flat walls 30b positioned on respective sides of the seat 30a and provided with threaded holes 30c. Each of the supports 30 cooperates with a yoke element 33 (see FIG. 1) which spans the seat 30a and is secured in position by means of bolts 34 engaging in the holes 30c in the flat walls 30b. Each yoke element 33 has a seat which together with the corresponding seat 30a defines a circular seat for the camshaft 31. Holes 35 formed in the dividing walls 28 serve to slidably locate the normal push rods 36 which cooperate with the cams of the camshaft 31 to control the displacement of the induction and discharge valves associated with the various engine cylinders.

The aluminium intermediate part 3 is also provided with a number of vertical cylindrical apertures 37 (see FIGS. 2 and 3) which communicate the space 32 defined between the intermediate part 3 and the cap element 4, with the breather cavity 18 defined between the intermediate part 3 and the lower part 2 of the cylinder head. The upper end of each cylindrical aperture 37 opens out onto an annular surface 37a which is raised above the upper surface of the dividing wall 28. Owing to the presence of the vertical cylindrical apertures 37, the level of the lubricating oil in the oil bath 27 can never rise above the surfaces 37a onto which the apertures 37 open out. The apertures 37 thus enable the lubricating oil level in the bath 27 to be kept at the desired height. Furthermore, each cylindrical aperture 37 is arranged coaxially with one of the bolts 23 which are used to fix the cast iron lower part 2.

By making the lower part 2 of the cylinder head in cast iron it is possible to avoid the difficulties experienced when cylinder heads of this type are produced in aluminium. Such difficulties are usually due to the different amounts of thermal expansion which occur in the aluminium forming the heads and in the cast iron forming the engine blocks when both the head and the block are subjected to high temperatures during engine operation. The parts of the cylinder head 1 subjected to the higher temperatures during engine operation are the internal walls 15 which delimit the precombustion chambers 7 and the cylinder head base wall 40 which faces the engine cylinders 6 when the cylinder head 1 is positioned on the engine block 5. Although in the described cylinder head 1 the cast iron lower part 2 directly contacts the aluminium intermediate part 3, the difference in the thermal expansions of the aluminium and iron does not cause problems since the parts 2 and 3 contact each other in a region which is sufficiently far removed from the hot areas of the head.

The construction of the cylinder head 1 in two main parts 2 and 3, does however greatly facilitate the formation of the internal cavity 18 which is used for emission of air from below the pistons during the operation of the engine. In fact, by producing the cylinder head in separate parts, the casting operations involved in producing the head are generally simplified. Furthermore, the intermediate part 3 also serves to support the engine camshaft 31 within an oil bath 27 filled with lubricating oil. The cylindrical apertures 37 regulate the lubricating oil level within the bath 27 and enable access to the bolts 23 fixing the lower part 2 to the cylinder block 5. Owing to this latter feature, when it is necessary to tighten such bolts following inspection, the aluminium intermediate part 3 does not have to be removed from the cast iron lower part 2. Moreover, there are no connecting bolts between the aluminium intermediate part 3 and the engine block 5.

A further notable feature of the described cylinder head is the provision of a horizontal dividing wall 28 within the cooling chamber 12. This wall 28 separates the lower part of the chamber 12 adjacent the precombustion chamber 7, from the upper part adjacent the fuel injector seats 8. The wall 38 is provided with a restricted opening 39 adjacent each precombustion chamber 7 which serves to inter-communicate the upper and lower parts of the cooling chamber 12. As a result of this arrangement all of the coolant passing through the cooling chamber 12 is forced to flow near the internal walls 15 which delimit each precombustion chamber 7 to thereby ensure a more efficient cooling of these walls 15. The presence of the wall 38 also serves to keep the coolant in the lower part of the chamber 12 for a longer time which results in an improvement in the cooling of the base wall 40 of the cylinder head. Thanks both to the greater cooling efficiency brought about by the presence of the dividing wall 38, and to the stiffening effect of the dividing wall 38 on the overall strength of the cylinder head, it is possible to reduce the thickness of the base wall 40 with resultant advantages as regards the weight of the cylinder head 1.

We claim:

1. A cylinder head for a compression ignition internal combustion engine, wherein:
    (a) the cylinder head comprises a cast iron lower part which is to be fixed onto the cylinder block of said engine and which is formed to define walls delimiting both a cooling chamber through which engine coolant can flow, and a plurality of cavities providing for each of the cylinders of the engine a precombustion chamber, a seat for a fuel injector, and induction and discharge ducts,
    (b) the cylinder head further comprises an aluminium intermediate part mounted on said cast iron lower part, and an upper cap element of aluminium surmounting said intermediate part, the upper surface of the aluminium intermediate part being shaped to define a bath for lubricating oil and being provided with support means for rotatably supporting the camshaft of said engine, (c) said cast iron lower part and said aluminium intermediate part define between them a breather cavity which communicates with the outside and which when the cylinder head is mounted on said engine block is arranged to communicate with the space underlying the piston within each cylinder of the engine, so as to enable exhaust of air in said space as each piston travels towards its bottom dead centre position, (d) said aluminium intermediate part is formed to define a number of vertically-extending apertures which communicate at their lower ends with said breather cavity and which at their upper ends open out into the upper surface of the said intermediate part at a level above the bottom of said bath, said apertures serving to limit the level of lubricating oil within the bath, and (e) said cast iron lower part is formed to define bolt holes for the location of fixing bolts for securing the cast iron lower part to said engine block, said bolt holes lying within the external periphery of said intermediate part in alignment with respective ones of said apertures whereby access to said fixing bolts is possible without the need to remove the aluminium intermediate part from the cast iron lower part.

2. A cylinder head according to claim 1, in which each said cavity forming a fuel injector seat is positioned above the corresponding said precombustion chamber and is delimited therewith by a wall the external surface of which faces into said cooling chamber, said cooling chamber being separated by a dividing wall into a lower part associated with the precombustion chambers and an upper part associated with the said seats for the fuel injectors, said dividing wall being formed to define an opening adjacent each of the precombustion chambers which opening inter-communicates the upper and lower parts of the cooling chamber.

* * * * *